(12) United States Patent
Buising et al.

(10) Patent No.: US 9,365,077 B2
(45) Date of Patent: *Jun. 14, 2016

(54) LIGHTWEIGHT HUB BEARING ASSEMBLY AND PROCESSES FOR ASSEMBLING IT

(71) Applicant: Aktiebolaget SKF, Göteborg (SE)

(72) Inventors: Wijbe Buising, LW Houten (NL); Stefano Galfre, Perosa Argentina (IT); Alessandro Garrone, HS Utrecht (IT); Antonio Ruiu, Collegno (IT); Laura Sguotti, Bosco Marengo (IT); Cornelius Petrus Antonius Vissers, BT Den Dungen (NL)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,104

(22) Filed: Jan. 13, 2014

(65) Prior Publication Data
US 2014/0300178 A1    Oct. 9, 2014

(30) Foreign Application Priority Data
Jan. 11, 2013    (IT) .............................. TO2013A0024

(51) Int. Cl.
| F16C 35/06 | (2006.01) |
|---|---|
| B60B 27/00 | (2006.01) |
| F16C 35/063 | (2006.01) |
| F16C 19/18 | (2006.01) |
| F16C 33/60 | (2006.01) |

(52) U.S. Cl.
CPC ......... B60B 27/0005 (2013.01); B60B 27/0078 (2013.01); F16C 19/185 (2013.01); F16C 33/60 (2013.01); F16C 35/063 (2013.01); *B60B 2310/202* (2013.01); *B60B 2310/318* (2013.01); *B60B 2360/102* (2013.01); *B60B 2360/104* (2013.01); *B60B 2380/32* (2013.01); *B60B 2380/73* (2013.01); *B60B 2380/774* (2013.01); *B60B 2900/111* (2013.01); *F16C 2226/34* (2013.01); *F16C 2226/40* (2013.01); *F16C 2226/52* (2013.01); *F16C 2326/02* (2013.01); *Y02T 10/86* (2013.01); *Y10T 29/49535* (2015.01)

(58) Field of Classification Search
CPC . B60B 27/0005; F16C 35/063; F16C 19/185; F16C 33/60; F16C 2326/02; F16C 2226/34
See application file for complete search history.

(56) References Cited

U.S. PATENT DOCUMENTS

| 9,016,951 B2* | 4/2015 | Buising et al. ................ 384/544 |
| 9,028,151 B2* | 5/2015 | Galfre' et al. ................ 384/544 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A hub bearing assembly includes a hub of light metallic material forming a cylindrical portion, on which an inner tubular ring having a raceway is mounted; on the first inner tubular ring a second inner ring having a second raceway is fastened; formed between the cylindrical portion of the hub and the inner tubular ring is a cylindrical interstice containing a brazing bonding material or a structural adhesive which integrally binds the hub to the first inner tubular ring.

13 Claims, 3 Drawing Sheets

LIGHTWEIGHT HUB BEARING ASSEMBLY AND PROCESSES FOR ASSEMBLING IT

CROSS-REFERENCE TO RELATED APPLICATION

This application is a United States Non-Provisional Utility Patent Application claiming the benefit of Italia Patent Application Number TO2013A000024 filed on 11 Jan. 2013, which is incorporated herein in its entirety. It is noted that 11 Jan. 2013 falls on a Saturday; therefore Applicant is afforded until the next business day to maintain co-pendency.

TECHNICAL FIELD

The present invention relates to a lightweight hub bearing assembly, for a motor vehicle wheel. The invention also relates to a method for assembling this assembly.

BACKGROUND ART

In the automotive industry there is an ever increasing demand in terms of reduction of the weight of motor vehicle component parts in order to reduce fuel consumption and exhaust emissions. In order to reduce the overall weight of a wheel, and in particular of the rotating mass, in recent years hub bearing assemblies have been proposed having a rotating flanged ring made of two different materials, joined together in a single piece. In such rings, a tubular core made of a first material of high toughness, such as steel for bearings, forms the raceways, and a second light material, such as a light metal, forms the remaining part of the ring, including an outer flange for mounting the wheel.

In some cases, the coupling between the steel core and the lighter flange is made by form coupling with interference. These couplings do not always prove to be long-lasting, especially after prolonged use. Indeed, the different coefficients of thermal expansion of steel and aluminum tend to cause the two materials to separate one from the other. In other cases, the coupling is obtained by molding or casting the light material, for example an aluminum alloy, over the tubular steel core. To avoid or limit movements between the two materials, in rings of this type, the two materials are joined with complex-shaped interface surfaces, so as to produce undercuts that behave as joints between the two materials. See for example the patent publication WO 2008/147284 A1. The costs of producing rings using this technology are rather high.

SUMMARY OF THE PRESENT INVENTION

The present invention has therefore the object to provide a hub bearing assembly of reduced weight, addressing principally the problem of providing a reliable mechanical connection between two different materials in the hub, optimizing the production costs.

For the achievement of the purposes set out above, the invention proposes to build a hub bearing assembly having the features defined in claim 1. According to another aspect, the invention proposes a method of assembly as defined in claim 8. Preferred embodiments of the invention are defined in the dependent claims.

BRIEF DESCRIPTION OF DRAWINGS

Certain preferred embodiments of the invention, but without any limitation, are described below, with reference to the accompanying drawings, in which.

DETAILED DESCRIPTION OF THE PRESENT INVENTION

Figure 1:
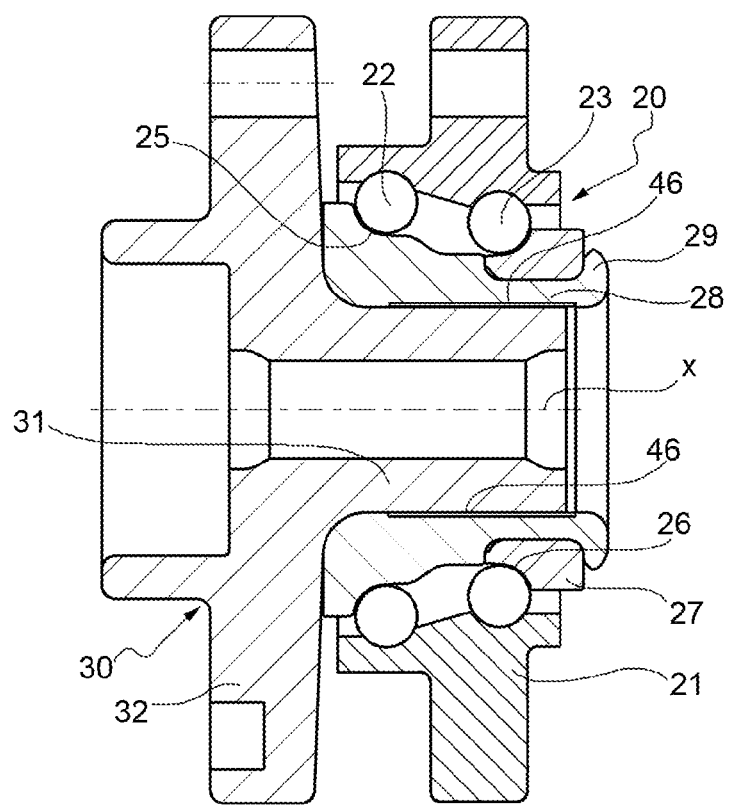
FIG. 1 is a schematic view in axial section of a hub bearing assembly according to an exemplary embodiment of the present invention.
Figure 2:
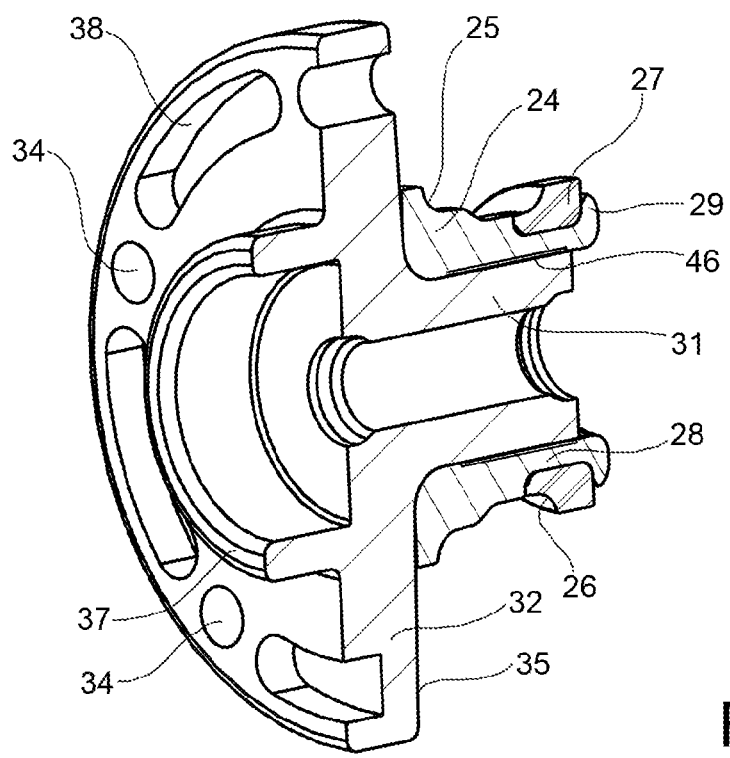
FIG. 2 is a sectional perspective view of a flanged hub, being part of the assembly of FIG. 1, with two bearing rings fixed to the hub.

An example of a hub bearing assembly according to the invention is illustrated in axial section in FIG. 1.

The assembly includes a hub 30 of a lightweight metallic material, preferably an aluminum alloy, and a bearing unit 20 having a double row of rolling elements.

The bearing unit includes an outer ring 21 with two outer raceways for accommodating a first row 22 and a second row 23 of rolling elements, in this example balls. The bearing unit further includes a tubular inner ring 24 having a first, axially outer, raceway 25 for the first row 22 of rolling elements. A second inner raceway 26, for the axially inner row of rolling elements 23, is formed on an inner ring 27 made separately from the tubular ring 24. The inner ring 27 is built separately to allow the second row 23 of rolling elements to be inserted into the bearing unit, after the outer ring 21 has been mounted on the first row 22. The inner ring 27 is mounted on an axial extension 28 of the inner tubular ring 24. An axially inner end of the axial extension 28 is deformed by cold roll orbital forming, in a radially outer direction, thus obtaining a rolled edge 29, plastically deformed, which axially locks the inner ring 27.

The hub bearing assembly defines a central rotation axis x and is designed to rotatably mount a wheel (not shown) of a motor vehicle around the axis x. Throughout this description and in the claims, the terms and expressions indicating positions and directions such as for example "radial", "axial", "transverse", are to be understood as referring to the axis of rotation x. Expressions such as "axially inner" (or "inboard") and "axially outer" (or "outboard"), on the other hand, refer to the condition mounted on the vehicle.

Figure 3:
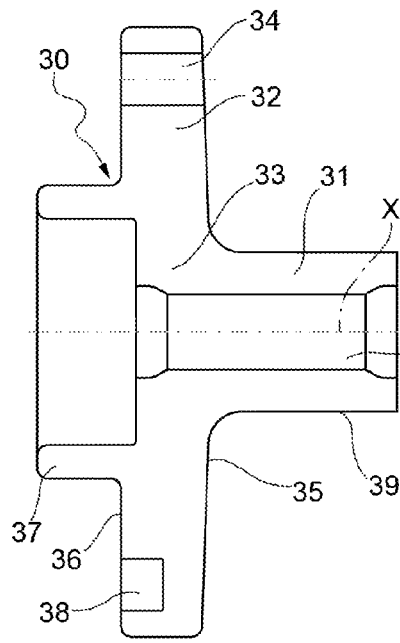
FIG. 3 is a view in axial section of the flanged hub.

The hub 30 (shown alone on FIG. 3) forms, in a single piece of lightweight metallic material, a cylindrical portion 31 extending in an axial direction, and a flange 32 extending in a radially outer direction from an axially outer end 33 of the cylindrical portion 31.

The hub 30 can be formed for example by casting or forging. Examples of aluminum alloys suitable for building the hub include, but are not limited to, the following: 6061 T6, 6082 T6 or T5, A 356 T6, 43500 T6. Once the desired shape is obtained, the hub can undergo a thermal cycle, preferably a T6 thermal cycle, to improve the mechanical properties of the aluminum alloy material. Alternatively, the hub can undergo a heat treatment of precipitation hardening.

The flange 32 serves to mount a wheel of the vehicle. Four/five axial holes 34 can be formed in the flange in angularly equidistant positions around the axis x. The holes 34 are suitable to accommodate a corresponding plurality of fixing elements (not shown), for example screws, for fastening the wheel. The flange 32 has an axially inner radial surface 35, designed to be directed toward the vehicle while in use, and an axially outer radial face 36, forming an even support surface for a brake rotor (not shown) and/or for the wheel. The hub 30 can also form an axial tubular tailpiece 37 protruding from the axially outer side, to facilitate the centring of the wheel. Reference 38 denotes optional lightening cavities, formed in flange 32.

The cylindrical portion 31 has a radially outer cylindrical surface 39 which is introduced into the inner tubular ring 24, as described later.

In the embodiment illustrated here, the cylindrical portion 31 has a tubular shape and includes, in this example, a radially extending inner cylindrical cavity 40. In this particular embodiment, the inner cavity 40 passes through the whole body. In other embodiments, depending on the type of wheel to be fitted (i.e. driving or driven), the cavity 40 can be closed. In still other embodiments, the cylindrical portion 31 may be internally full, i.e. with no cavity 40.

Figure 4:
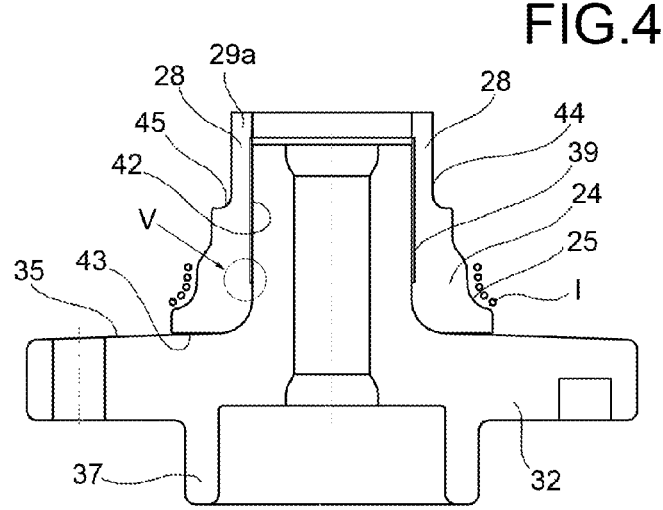
FIGS. 4, 6, 7 and 8 are sectional views illustrating different steps of assembling the hub bearing assembly.
Figure 6:
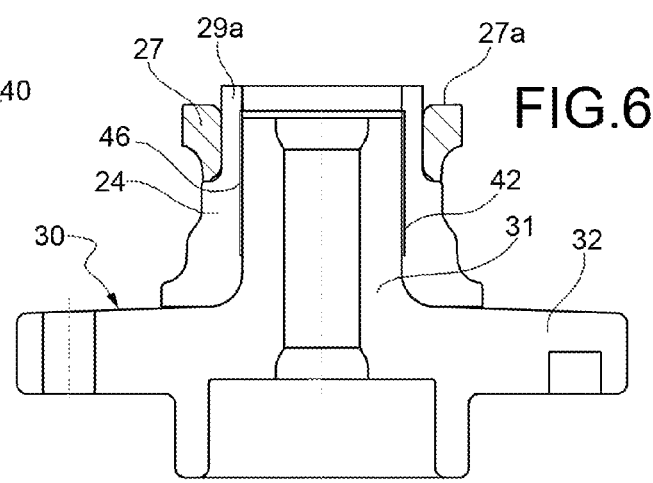

According to a first embodiment of the method, a hub 30 is oriented by vertically placing the cylindrical portion 31, with the axially inner end facing upwards (FIG. 4). The inner tubular ring 24, which forms the raceway 25 for the row of rolling elements 22, is slipped onto the cylindrical portion 31. Preferably the inner tubular ring 24 is made of steel for bearings. The tubular ring 24 has a radially inner cylindrical axial cavity 42, a radial surface 43 at an axially outer end and the axial extension 28 having an axially inner tubular end 29a, initially straight. The axial extension 28 has a cylindrical outer surface 44 joined to a radial shoulder 45 oriented in the axially inner direction.

The tubular ring 24 is pushed along the cylindrical portion 31 of the hub until the axially outer radial surface 43 is brought into abutment against the axially inner side 35 of the flange 32.

Figure 5:
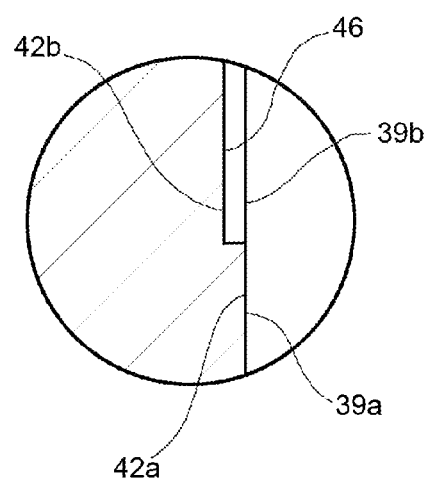
FIG. 5 is an enlarged view of a detail indicated with "V" in FIGS. 4 and 7.
Figure 7:
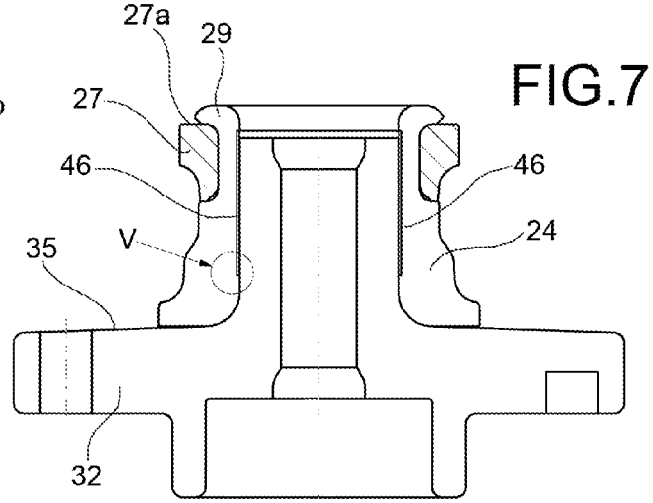

As represented schematically in the enlarged view of FIG. 5, a cylindrical interstice 46 is located between the outer cylindrical surface 39 of the hub and the axial cylindrical cavity 42 of the tubular ring 24. The radial thickness of the interstice 46 can vary depending on several factors. For the embodiment described herein, which includes the introduction of a brazing material in the interstice 46, encouraging experimental results were obtained with cylindrical interstices having a radial thickness between about 70 and about 100 microns. This range is only indicative, the method can also be implemented with greater radial thicknesses.

Preferably, the cylindrical interstice 46 is closed or sealed at the axially outer end (FIG. 5) because of the contact between the cylindrical cavity 42 of the tubular ring 24 and the outer cylindrical surface 39 of the hub. In the illustrated example, the cylindrical cavity 42 is realized with an axially outer portion 42a having a diameter needing a radial interference coupling with the outer cylindrical surface 39 of the hub, and an axially inner portion 42b having a diameter slightly larger than the diameter of portion 42a. More particularly, portion 42a, axially closer to the flange 32, is coupled with radial interference with an axially outer first length 39a of the outer cylindrical surface 39 of the hub; a portion 42b of the cavity 42, axially farther from the flange 32, has an internal diameter larger than the outer diameter of an axially inner second length 39b of the outer cylindrical surface 39. This second length 39b is radially facing and spaced from the portion 42b of larger diameter and defines, with this wider portion 42b, the cylindrical interstice 46.

In a different embodiment, the cylindrical interstice 46 is created by reducing the outer diameter of an axially inner length of the outer cylindrical surface 39 of the tubular portion 31; in yet another embodiment, the cylindrical interstice 46 is created partially by reducing the outer diameter of an axially inner length of the outer cylindrical surface 39 of the tubular portion 31 and in part by creating an enlarged portion 42b in the cavity 42, radially facing said length of reduced outer diameter of the outer cylindrical surface 39.

The interstice 46 is open at its axially inner end, which is oriented upwards in the example of FIGS. 4-7. Then a bonding material is introduced into the interstice 46, around the cylindrical portion 31 of the hub. In one embodiment of the process, the bonding material is a brazing material with a lower melting temperature than both the annealing temperature of the metal alloy of which the hub is made and the tempering temperature of the steel constituting the tubular ring 24. The brazing material can be made for instance from brazing alloys. The brazing material may be shaped as an annular sheet or a ring.

The brazing material is then heated and melted, for example by applying an inductor coil (not shown) around the tubular ring 24. Depending on the characteristics of the brazing material and the radial thickness of the interstice 46, the melted brazing material drips by gravity and penetrates into the interstice through capillarity, thus filling it. The brazing material then cools and solidifies, thereby creating a strong mechanical junction at the interface between the hub and the tubular ring 24.

Preferably, the steel surface of the cylindrical cavity 42 is not ground, since a certain degree of roughness increases the adhesion between the steel and the brazing filler material.

Brazing alloys suitable for the process for joining the steel and the aluminum alloy, are, for example:

"509 Strongset", marketed by ESAB; brazing temperature=265° C., tensile strength approximately 200 MPa;

"Al Solder 500" marketed by Harris Product Group; brazing temperature=199° C., tensile strength approximately 135 MPa;

"Nocolok", marketed by Solvay Chemicals; brazing temperature=613° C., tensile strength approximately 240 MPa.

Experimental tests carried out by the Applicant have shown excellent results in terms of mechanical resistance and total absence of thermal stability problems during the life of the hub bearing assembly.

The second inner bearing ring 27, that has the radially inner raceway 26 for the axially inner row of rolling elements 23, is then fitted over the axial extension 28 of the tubular ring 24 or, more exactly, on the outer cylindrical surface 44. The inner ring 27, which may be a traditional type inner bearing ring, is brought to abut axially against the shoulder 45 of the tubular ring 24. In order to further improve the mutual circumferential locking between the rings 24 and 27, the inner ring 27 can be mounted with radial interference on the cylindrical surface 44 of the tubular ring 24. In this condition (FIG. 6), the end 29a of the tubular ring 24 protrudes axially, at least partially, over a radial surface or end face 27a of the inner ring 27 facing in an axially inner direction.

The tubular end 29a (FIG. 7) is then deformed by cold orbital roll forming, in a radially outward direction. In this way the plastically deformed rolled edge 29 is obtained that axially locks the inner ring 27 against the shoulder 45 of the tubular ring 24 and axially preloads the entire bearing unit 20.

Those skilled in the art will recognise that the orbital roll forming phase is carried out after a series of bearing unit assembly stages in which the hub 30 is integrated; these steps, preceding the orbital roll forming step, involve first arranging the row of rolling elements 22 from the axially outer side or outboard side around the tubular ring 24, and then applying the radially outer bearing ring 21, inserting the row of rolling elements 23 from the axially inner side, or inboard side, after which the inner ring 27 can then be applied and the orbital roll forming finally carried out.

Optionally, the brazing step can be performed simultaneously to an induction hardening step which can be performed to harden the area of the raceway 25 of the tubular ring 24. The same inductor, schematically indicated with I in FIG. 4, is thus advantageously used both to harden the raceway 25 and to cause the melting of the brazing material.

Figure 8:
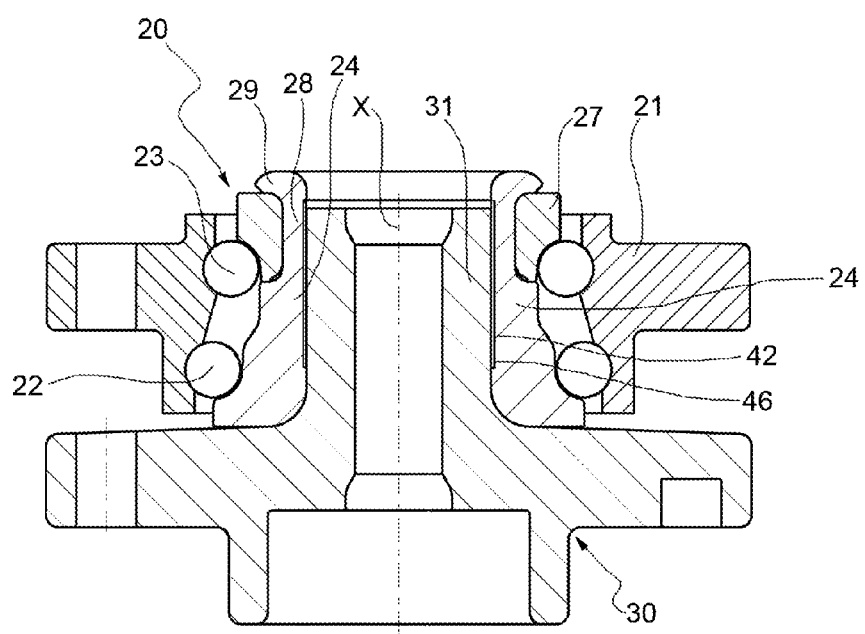

According to another embodiment of the process represented in FIG. 8, the brazing step to join the hub to the tubular ring 24 can be performed after having pre-assembled the entire bearing unit 20 with a tubular ring 24, outer ring 21, the double row of rolling elements 22, 23, and the inner ring 27 locked by the rolled edge 29 of the tubular ring 24. In accordance with this embodiment, the entire pre-assembled bearing unit 20 is applied on the cylindrical portion 31 of the hub. The procedure is then completely similar to that described above, applying the brazing material in the interstice 46 defined between the cylindrical surfaces 39 and 42, causing the brazing material to melt and solidifying the molten material that fills the interstice.

According to other embodiments of the process, the bonding material is a structural adhesive, introduced into the interstice 46 between the outer cylindrical surface 39 of the tubular portion 31 of the hub and the cylindrical cavity 42 of the tubular ring 24. In these variants of the process, the structural adhesive may require an interstice of radial thickness greater than is necessary for brazing, for example of the order of about 200 microns or more. Similarly to the embodiments described above, the materials constituting the various components of the unit may be the same as mentioned above: the assembly sequences may indifferently either provide for the introduction of the adhesive into the interstice 46 so as to connect the hub with an entire, already pre-assembled bearing unit (FIG. 8), or only with the tubular ring 24 (FIG. 4) to which the other bearing unit components are then successively mounted. Also in these variants, it is preferable that the cylindrical interstice 46 is closed or sealed at the axially outer end, for example because of the direct contact between the cylindrical cavity 42 and the outer cylindrical surface 39 of the hub, or by way of an additional sealing element.

Structural adhesives particularly suitable for the process are resins which can be polymerized. It is preferable to use a suitable adhesive to withstand operating temperatures up to 200° C., for example an adhesive based on modified acrylic, polyurethane and epoxy resins, able to withstand great mechanical stresses, preferably shear stresses between 15 and 30 MPa.

Structural adhesives suitable for the process for joining the steel and the aluminum alloy are, for example:
400 NA Epoxy
3M DP920
BETAMATE
Henkel Loctite Times and methods of application of the adhesive and the pressure and temperature levels and gradients required for hardening or polymerization of the adhesive depend on the type of adhesive chosen. These devices are known in the art and do not need to be described here in detail.

The adhesive that fills the cylindrical interstice, once hardened or polymerized, cements together the hub 30 and the tubular ring 24.

It is understood that the invention is not limited to the embodiments described and illustrated here, which are to be considered as examples of the assembly and of the processes for assembling it; those skilled in the art will understand that it is possible to make various changes as regards shapes, sizes, constructive and functional details and configuration of the elements described in the exemplary embodiment, without departing from the scope of the invention as defined in the appended claims and their equivalents.

What is claimed is:

1. A hub bearing assembly, comprising:
   a single-piece hub formed of a first metallic material and including:
      a cylindrical portion extending in an axial direction and having a cylindrical outer surface, and
      a flange extending in a radially outward direction from an axially outer end of the cylindrical portion;
   a bearing unit, comprising:
      an outer ring having two outer raceways for accommodating a first, axially outer row and a second, axially inner row of rolling elements,
      a first tubular inner ring made of a second metallic material and having a first raceway for the first row of rolling elements and an inner, axially extending cylindrical cavity, and
      a second inner ring having a second raceway for the second row of rolling elements, the second inner ring being fixed on the first tubular inner ring;
   a cylindrical interstice between the outer cylindrical surface of the hub and the axial cylindrical cavity of the first tubular inner ring, and
   a bonding material in the interstice and integrally joined to the outer cylindrical surface of the hub and to the axial cylindrical cavity of the first tubular inner ring.

2. The hub bearing assembly according to claim 1, wherein the first tubular inner ring further includes:
   a radial surface at an axially outer end, axially abutting against the flange of the hub;
   an axial extension extending in an axially inner direction and having an outer cylindrical surface;
   a radial shoulder facing an axially inner direction and joined to the outer cylindrical surface; and
   a tubular end edge plastically deformed in a radially outer direction against a radial surface of an axially inner end of the second inner ring, so as to axially lock the second inner ring against the radial shoulder and axially preload the entire bearing unit.

3. The hub bearing assembly according to claim 1, wherein the cylindrical interstice is closed or sealed at an axially outer end thereof.

4. The hub bearing assembly according to claim 3, wherein the cylindrical cavity includes:
   a portion axially closer to the flange, coupled with radial interference with a first length of the outer cylindrical surface of the hub, so as to close or seal the cylindrical interstice at an axially outer end thereof; and
   a portion axially farther from the flange, having an inner diameter greater than an outer diameter of a second length of the outer cylindrical surface of the hub, wherein the second length is axially inner with respect to the first length, the second length being radially facing and spaced from the portion of greater diameter and defining, with this greater diameter portion of the cylindrical cavity, the cylindrical interstice.

5. The hub bearing assembly according to claim 1, wherein the first metallic material is an aluminum alloy, and the second metal material is a bearing grade steel.

6. A method of assembling a hub bearing assembly, comprising the steps of:
   a1) providing a single-piece hub formed of a first metallic material, the hub including:
      a cylindrical portion extending in an axial direction and having a cylindrical outer surface, and a flange extending in a radially outward direction from an axially outer end of the cylindrical portion;

a2) providing a bearing unit comprising:

an outer ring including two outer raceways for accommodating a first axially outer row and a second axially inner row of rolling elements;

a first tubular inner bearing ring made of a second metallic material and a first raceway for a first row of rolling elements and an inner, axially extending cylindrical cavity; and a second inner ring having a second raceway for a second row of rolling elements, the second inner ring being fixed on the first tubular inner ring;

b) arranging said tubular ring around the cylindrical portion of the hub so as to define a cylindrical interstice between the outer cylindrical surface of the hub and the axial cylindrical cavity of the tubular ring;

c) integrally bonding the hub and the tubular ring by means of a bonding material contained in the interstice.

7. The method according to claim 6, wherein the interstice has an axially inner open end and step c) is preceded by the step of introducing the bonding material in the interstice through said open end.

8. The method according to claim 6, wherein step c) comprises the step of orienting the hub by arranging the cylindrical portion with the axially inner end facing upwards.

9. The method according to claim 6, wherein the bonding material is a structural adhesive with a polymer resin base, and the step c) includes the step of heating the adhesive so as to allow it to fill the interstice at least partially, and then applying heat and pressure causing the adhesive to cure so that the cured adhesive is integrally joined to the outer cylindrical surface of the hub and the axial cylindrical cavity of the first tubular inner ring.

10. The method according to claim 6, wherein step b) includes the step of sealing an axially inner end of the interstice by coupling with radial interference between an axially outer length of the outer cylindrical surface of the hub and an axially outer portion of the cylindrical cavity.

11. The method according to claim 6, wherein the bearing unit further comprises:

two rows of rolling elements;

a tubular end edge formed by the tubular extension and plastically deformed in a radially outer direction against a radial surface of an axially inner end of the second inner ring.

12. The method according to claim 6, wherein the bonding material is a brazing material and step c) includes the steps of melting the brazing material, allowing the molten brazing material to fill the interstice at least partially, and then solidifying the brazing material so that the solid brazing material is integrally joined to the outer cylindrical surface of the hub and the axial cylindrical cavity of the first tubular inner ring.

13. The method according to claim 12, wherein in step c) the step of melting the brazing material occurs simultaneously with an induction hardening step, and these two simultaneous steps are carried out by means of an inductor arranged around the raceway of the first tubular inner ring, so as to harden the raceway and cause the brazing material contained in the interstice to melt.

* * * * *